Feb. 28, 1939.                    E. E. HEWITT                    2,148,753
                            MAGNETIC BRAKE CONTROLLER
                            Filed Oct. 16, 1936            4 Sheets—Sheet 3
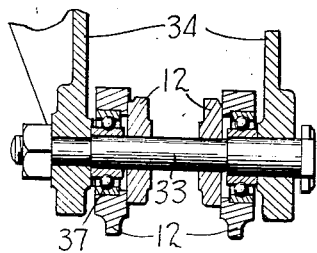
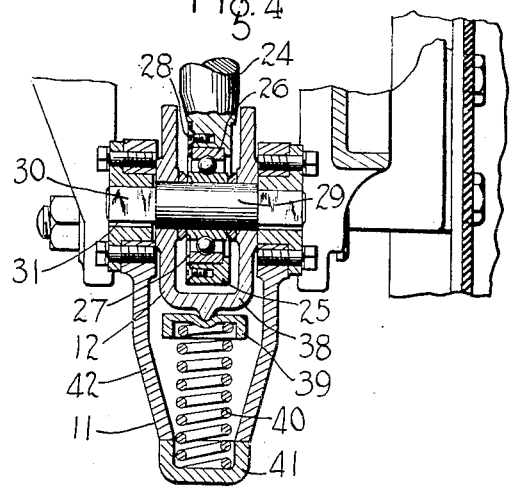
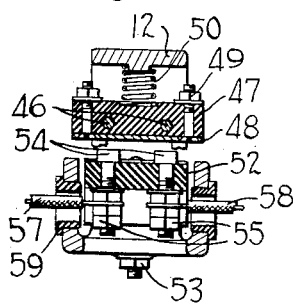
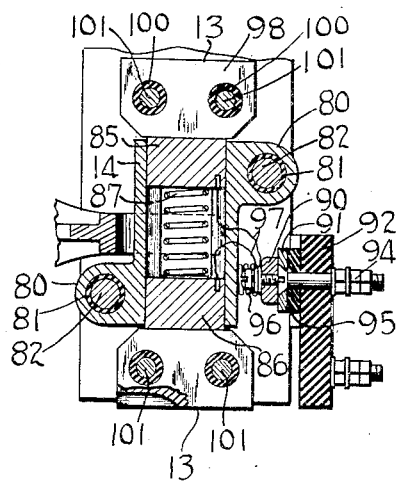
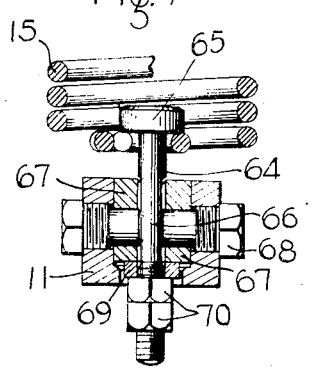
INVENTOR
ELLIS E HEWITT
BY Wm. M. Cady
ATTORNEY

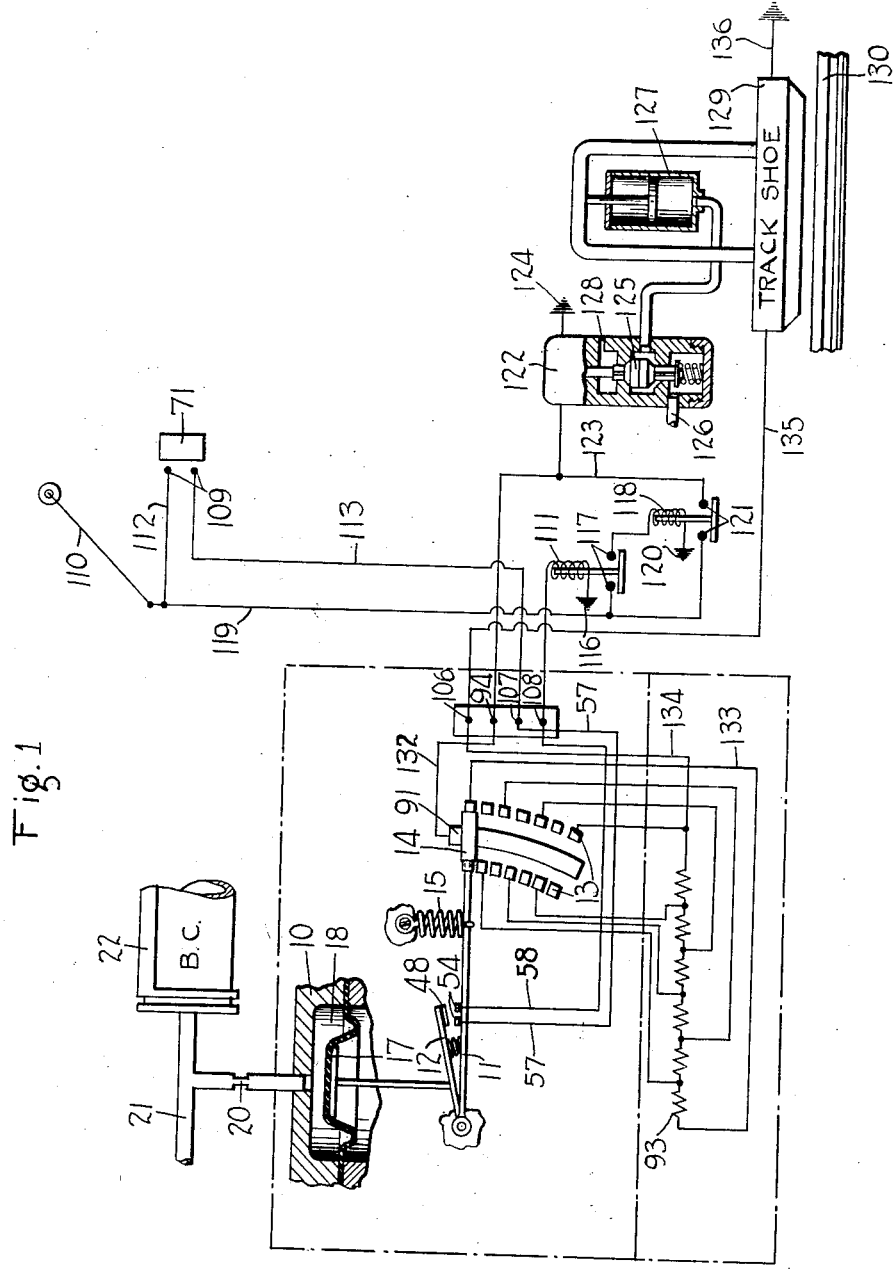

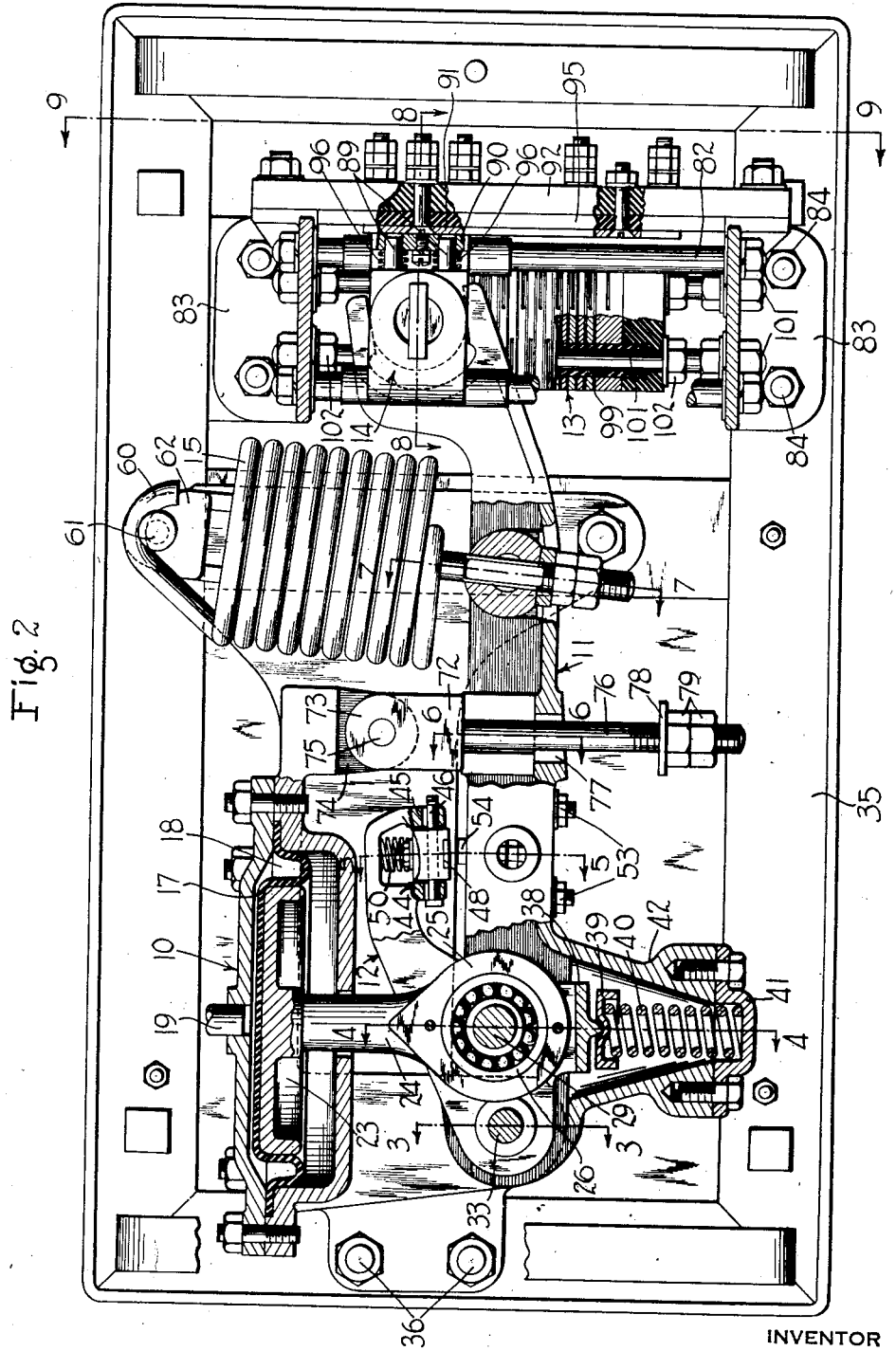

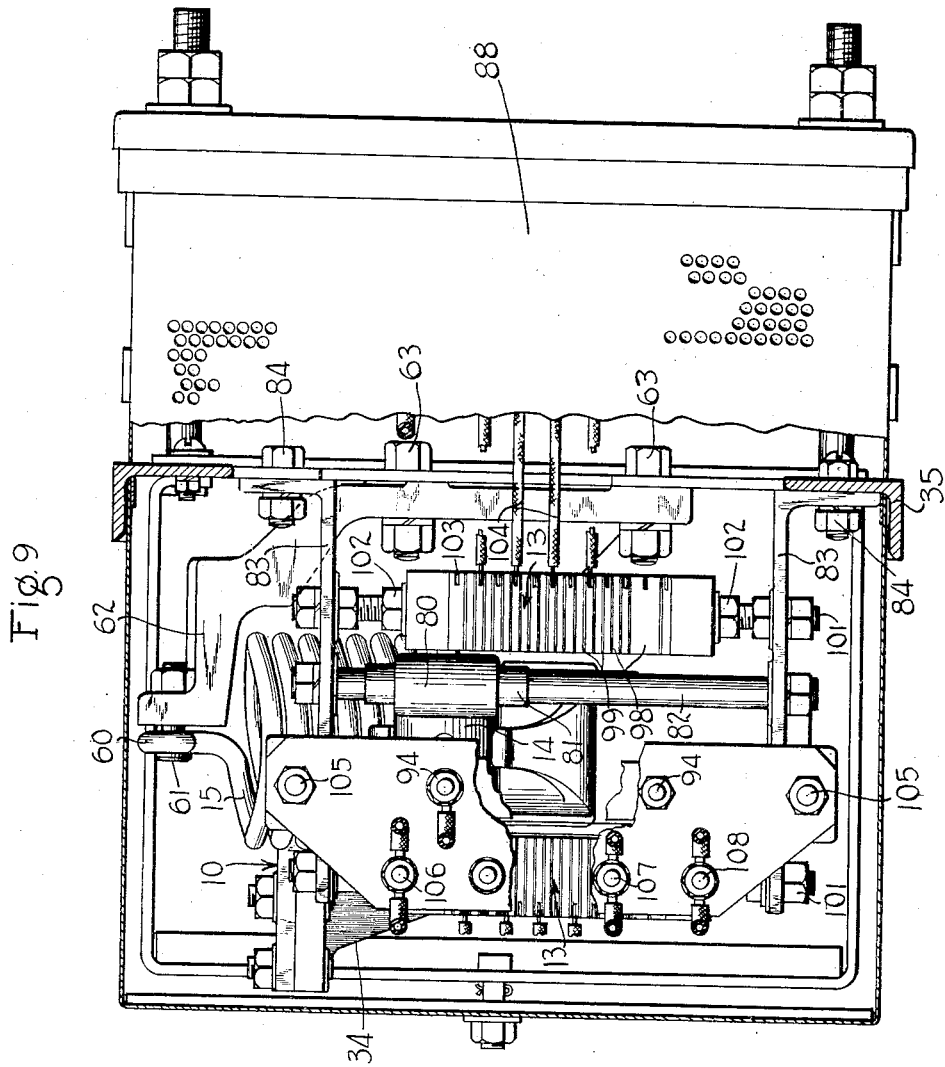

Patented Feb. 28, 1939

2,148,753

UNITED STATES PATENT OFFICE 2,148,753

MAGNETIC BRAKE CONTROLLER

Ellis E. Hewitt, Edgewood, Pa., assignor to The Westinghouse Air Brake Company, Wilmerding, Pa., a corporation of Pennsylvania Application October 16, 1936, Serial No. 105,976

5 Claims. (Cl. 201—48)

This invention relates to magnetic brake controllers, and in particular to magnetic brake controllers of the fluid pressure operated type for controlling the supply of current to a magnetic track brake device or other type electric brake device.

In order to increase the flexibility of the control of magnetic track brakes, or other types of electric brakes to which current is supplied thereto, it is desirable that means be provided for graduating the supply of current in relatively fine increments. When used, magnetic track brakes are as a rule a part of a brake equipment also employing fluid pressure operated brakes. A preferred arrangement is to have the magnetic track brakes controlled in accordance with the brake cylinder pressure in the fluid pressure brake system. To accomplish this, the current supplied to the magnetic track brake devices should be graduated in as fine increments as it is possible to graduate the brake cylinder pressure.

It is a principal object of the present invention to provide an improved fluid pressure operated rheostat mechanism for controlling the supply of current to magnetic track brake devices, or other similar types of electric brake devices, in which the current supplied thereto may be varied in relatively fine increments.

A yet further object of the present invention is to provide an improved fluid pressure operated rheostat embodying an improved mechanical construction which is capable of operating effectively over a long period without necessitating frequent repairs, which may be manufactured economically, and which is sufficiently rugged to withstand the shocks incident to installation on modern traction vehicles which operate at relatively high speeds.

Other objects of the invention will be more readily understood from the following description, which is taken in connection with the attached drawings, wherein, Fig. 1 shows in schematic and diagrammatic form the adaptation of a rheostat device embodying the features of the present invention to a simple magnetic track brake system.

Fig. 2 is a view, partly in section, of an actual rheostat device embodying the features of the invention.

Figs. 3 to 9, inclusive, are sectional views taken along the lines 3—3, 4—4, 5—5, 6—6, 7—7, 8—8, and 9—9, respectively, of Fig. 2, showing various details of the rheostat device.

Referring now principally to Figs. 2 and 9, the principal parts of the improved rheostat device are an operating cylinder 10, a main operating arm 11, a contact operating arm 12, two commutator sections 13, a brush holder 14, and a calibrated balancing spring 15.

The operating cylinder 10 comprises a casing having mounted therein a flexible diaphragm 17 forming with the casing a pressure tight chamber 18. The chamber 18 is open to a pipe 19, which pipe, as shown in Fig. 1, connects by way of a choke 20 to a pipe 21 leading to a brake cylinder 22 forming a part of a fluid pressure brake system.

Referring again to Fig. 2, a follower 23 is disposed adjacent one side of the diaphragm 17 and has attached thereto a stem or rod 24 terminating in an eye 25 in which is secured a roller bearing 26, held in place by a plate 27 secured to the eye 25 by screws 28 (see Fig. 4). A wrist pin 29 passes through the roller bearing 26 and thus joins or connects the rod 24 to the contact operating lever 12.

The wrist pin 29 is provided at each end with a square shaped extension 30 projecting into elongated coacting recesses or slots 31 in the main operating lever or arm 11. Both the main arm 11 and the contact operating arm 12 are pivotally disposed on a pin or bolt 33 carried by two arms of a bracket 34. The bracket 34 is secured to a bed plate 35 by means of bolts 36. Where the bolt 33 passes through the main arm 11 ball bearings 37 are provided.

Integral with the contact operating arm 12 is a downwardly projecting portion 38 bearing upon a spring cup 39, below which is disposed a spring 40. The spring 40 is positioned by a spring cap 41 secured to a spring housing 42 projecting downwardly from the main arm 11.

The contact operating arm 12 is provided with two lug members 44, each of which has two slotted apertures 45 therein for receiving pins 46. The two pins 46 carry intermediate the lugs 44 an insulating member 47 upon which is mounted a contact plate 48, the plate being secured to the insulating member by bolts 49. A spring 50 back of the insulating member 47 acts upon it to urge it downwardly, as viewed in Figs. 2 and 5.

As particularly shown in Fig. 5, an insulating member 52 is secured to the main operating arm 11 by bolts 53, and this insulating member carries two contacts 54 mounted thereon and having nuts 55 for securing a conductor 57 to one of the contact terminals and a conductor 58 to the other. These conductors may each pass through an insulating bushing 59 suitably mounted in apertures in the side walls of the channel shaped portion of the main operating arm 11.

As will be obvious from the arrangement described, the spring 40 acting on the contact operating arm 12 maintains the contact plate 48 out of engagement with the two contacts 54, but when fluid under pressure is supplied to the operating cylinder chamber 18 the diaphragm will be deflected downwardly. Due to the clearance allowed in the two slots 31 in the main operating arm 11, the contact operating arm 12 is first actuated to cause the contact plate 48 to engage the two contacts 54, the spring 50 insuring the making of a good contact, and thereafter the square extensions 30 of the pin 29 bear upon the main operating arm 11 to actuate it downwardly.

Movement of the main arm 11 is opposed by the calibrated balancing spring 15. This spring has one end thereof formed in the shape of a hook, as shown at 60, and this end is hooked over a pin 61 fastened in a bracket 62, which bracket is bolted to the frame 35 by means of bolts 63. The other end of the spring 15 is curled about the shank of a bolt 64 (see Fig. 7) beneath a head 65. The bolt 64 has a portion of its shank narrowed at 66, which passes between two washers 67 placed between the side walls of the arm 11 and held in place by bolt pins 68. As shown in Fig. 7, a washer 69 is disposed on the bolt 64 between two nuts 70 and the lower edges of the two centering washers 67. The centering washers 67 are free to move on the pin bolts 68, so that a pivotal connection is formed.

In the position of the main operating arm 11 shown in Fig. 2, the arm rests against a stop 72, which stop is provided with bifurcations 73 which are secured to a lug 74 by means of a pin 75. Attached to the stop 72 is a stud 76 which passes through an opening 77 in the main operating arm, and has disposed thereon a washer 78 and two nuts 79. By suitably adjusting the two bolts 79, the swing of the arm 11 between the stop 72 and the washer 78 may be adjusted.

As shown in Fig. 2, the extreme right hand end of the main arm 11 is bifurcated to receive the brush holder 14. There is no rigid attachment between the brush holder and the main operating arm 11, the bifurcations of the main arm merely pressing upon the brush holder, and sliding laterally with respect thereto so that the brush holder may move in a vertical direction while the arm is moving in an arcuate pathway.

Referring now particularly to Fig. 8, the brush holder 14 comprises a casing having two ears or lugs 80 each of which has an aperture therethrough in which is disposed an insulating tube 81. The tubes 81 are adapted to slide on rods 82 carried by bracket 83 secured to the frame 35 by bolts 84.

Within the brush holder casing are disposed two brushes 85 and 86, urged apart by a spring 87. Each brush is adapted to engage one of the commutator sections 13. The brush holder casing also has projecting therefrom two pins 89, on which is slidably disposed a contact shoe 90 for engaging a contact bar 91 secured to a terminal board 92 by bolts 94, with a spacer 95 of insulating material disposed therebetween. Springs 96 disposed on the pins 89 maintain the contact shoe 90 in contact with the contact bar 91. Leads 97 connect the contact shoe 90 with the two brushes 85 and 86.

Each of the commutator sections comprises a plurality of contact plates 98, preferably of copper or like material, interleaved with sheets of insulation 99, such for example as mica. Both the contact plates and insulating sheets are apertured to receive insulating tubes 100, so that each commutator section may be supported on two bolts 101 between nuts 102 from the aforementioned brackets 83.

The edge of each commutator section adjacent the brush 85 or the brush 86 is machined so that as the brush holder 14 is moved up and down, sliding on the rods 82, good contact is obtained between the brushes and the commutator contact plates.

Each of the contact plates 98 is slotted, as shown at 103, so that a cable 104 may be attached thereto, each contact plate being thus connected to a tap on a resistance mounted in a housing 88 which encloses the rheostat device, the resistance and its taps being diagrammatically indicated in Fig. 1 at 93. As is also diagrammatically indicated in Fig. 1, I prefer to connect the resistance taps to the contact plates in a manner such that as the brush holder 14 is moved downwardly it cuts out portions of the resistance 93 by engagement alternately with the contact plates of the two commutator sections.

The terminal board 92 is bolted to the frame 35 by means of bolts 105, and is provided with terminals 106, 107 and 108. In addition, the upper of the two bolts 94 also forms a terminal.

The terminal board, the insulating tubes, and similar insulating parts are preferably of Micarta or Bakelite, while all electrical contacting parts are preferably of copper or the like. All mechanical parts may, of course, be of steel, iron, or similar low cost material.

Referring now to Fig. 1, the parts of the rheostat device shown diagrammatically which correspond to the parts in the actual rheostat device are designated by like numerals. It will, of course, be understood that in the diagrammatic arrangement the details of the actual construction and mode of operation are not shown exactly. For example, the brush holder 14 in the actual device, as clearly shown in Figs. 2 and 9, moves in a vertical direction, whereas it is shown as moving in an arcuate pathway in Fig. 1.

When the rheostat device is embodied in a brake system as illustrated in Fig. 1, the brakes are applied by supplying fluid under pressure through the pipe 21 to the brake cylinder 22 in any of the usual ways. This supply is graduated according to the desired degree of application of the brakes.

Fluid under pressure supplied to the brake cylinder 22 also flows through the choke 20 to the operating cylinder chamber 18, resulting in moving the diaphragm 17 downwardly. The rod 24 is thus first actuated to rock the contact operating arm 12, to cause the contact 48 to engage the two contacts 54. If in the meanwhile the motor controller has been shifted to off position, a contact 71 on this controller will have engaged and bridged two stationary contacts 109, so that closing of contacts 54 will establish a circuit from a trolley 110 through a relay 111, by way of conductor 112, contacts 71 and 109, conductor 113, terminal 107, conductor 57, contacts 48 and 54, conductor 115, terminal 108, relay 111, and ground connection 116.

The relay 111 will then close its contacts 117, thus forming a circuit also from the trolley 110 through a relay 118, this circuit comprising a conductor 119, relay contacts 117, relay 118 and ground connection 120. The relay 118 will then close its contacts 121 to establish a circuit to a magnet valve device 122, this circuit including conductor 119, contacts 121, and conductor 123, the return connection being by way of ground conductor 124.

With current supplied to it the magnet valve device 122 will shift a double beat valve 125 therein downwardly to close communication between a supply pipe 126 (leading to a source of fluid under pressure) and the chamber of a raising cylinder 127, and to vent the raising cylinder to the atmosphere by way of an exhaust port 128. As the pressure in the raising cylinder 127 diminishes the track shoe device 129 controlled thereby will drop to engagement with a track rail 130, due to gravity effect.

Closing of the contacts 121 of the relay 118 also establishes a circuit to the track shoe device 129, which circuit beginning at the contacts 121 includes conductor 123, terminal 94, conductor 132, contact bar 91, brush holder 14, a contact plate of one of the commutator sections 13, conductor 133, all of the resistance 93, conductor 134, terminal 106, and conductor 135, the return connection being by way of ground conductor 136. The track shoe device will thus be energized to a minimum value, since all of the resistance 93 is in the circuit.

However, as fluid pressure builds up in the rheostat chamber 18 and thus actuates the arm 11 downwardly, the brush holder 14 will pass over the contact plates of the two commutator sections 13, cutting out portions of the resistance 93, as will be obvious from the connections shown in Fig. 1. The movement of arm 11 downwardly is opposed by the calibrated spring 15, and when the opposition exerted by this spring just balances the force due to pressure in the cylinder chamber 18, the arm 11 will come to rest. When the arm thus comes to rest the current supplied to the track shoe device 129 will be proportional to the pressure of fluid in the chamber 18.

If the pressure in chamber 18 is varied, it will be obvious that the brush holder 14 will be actuated accordingly, so that by merely varying the pressure of fluid supplied to the brake cylinder the degree of current supplied to the track shoe device may be similarly varied. When the brake cylinder pressure is reduced substantially to atmospheric pressure, spring 15 will return the arm 11 to the position illustrated in Fig. 1, while the spring 40 will return the contact operating arm 12 to the position where contact 48 disengages from contacts 54. This will deenergize the relay 111, resulting also in deenergization of the relay 118, and thus releasing the track shoe device.

While I have illustrated my invention with particular reference to a specific detailed design, it is not my intention to be limited to the precise details shown, or otherwise than by the spirit and scope of the appended claims.

Having now described my invention, what I claim as new and desire to secure by Letters Patent, is:

1. In a rheostat device, in combination, a commutator, a brush for movement over said commutator, a first arm for moving said brush, a contact carried by said first arm, a second arm movable with respect to said first arm, a contact carried by said second arm, spring means urging said two arms apart whereby to maintain said two contacts out of engagement, and means including a fluid pressure operated device adapted to first actuate said second arm with respect to said first arm to cause engagement of said contacts, and to then actuate both arms to cause movement of said brush over said commutator.

2. In a rheostat device, in combination, two commutators, a brush movable over both of said commutators, a first arm for moving said brush, a contact carried by said first arm, a second arm movable with respect to said first arm, a contact carried by said second arm, spring means urging said two arms apart whereby to maintain said two contacts out of engagement, means including a fluid pressure operated device adapted to first actuate said second arm with respect to the said first arm to cause engagement of said contacts, and to then actuate both of said arms to cause movement of said brush over both of said commutators, and resistance means connected to both of said commutators in a manner such that it is cut in or out of a circuit by alternate engagement of said brush with portions of each of said commutators.

3. In a rheostat device, in combination, a plurality of commutators, two relatively fixed guiding members disposed adjacent said commutators, a brush element insulated from and slidable along the length of said guiding elements, whereby said brush element is movable over said commutators, a first arm for moving said brush element, a contact carried by said first arm, a second arm movable with respect to said first arm, a contact carried by said second arm, spring means urging said two arms apart whereby to maintain said two contacts out of engagement, and means including a fluid pressure operated device adapted to actuate said second arm with respect to said first arm to cause engagement of said contacts, and then to actuate both arms to cause movement of said brush element along said guiding elements and over said commutators.

4. In a rheostat device, in combination, two movable arms, a common pivot means for said two arms, spring means urging said two arms apart, a contact carried by one of said arms and a cooperating contact carried by the other of said arms, resistance means controlled by the movement of one of said arms, a fluid pressure operated device for actuating said two arms, and means so constructed and arranged that upon supply of fluid under pressure to said fluid pressure operated device one of said arms is first actuated by said device with respect to the other to cause engagement of said contacts, and then both of said arms are operated together by said device to operate said resistance means, the pressure produced by operation of said device maintaining said contacts in engagement while said two arms are operating together.

5. In a rheostat device, in combination, a first movable arm, a second arm movable with respect to and with said first arm, a contact carried by said first arm and a contact carried by said second arm, means associated with said first arm for loosely supporting the contact carried thereby and being arranged to permit uniform engagement between the engaging surfaces of said contacts when said two arms are moved toward each other, spring means acting upon one of said arms to maintain said contacts out of engagement, resistance means controlled by movement of one of said arms, and a fluid pressure operated device connected to one of said arms, said arms being so arranged that as said device is operated the connected arm moves toward the other arm to cause engagement of said contacts and then both of said arms are operated by said device to operate said resistance means.

ELLIS E. HEWITT.